United States Patent [19]

Thüer et al.

[11] Patent Number: 5,230,803
[45] Date of Patent: Jul. 27, 1993

[54] GROUND- AND WASTEWATER PURIFICATION

[75] Inventors: Markus Thüer, Rheinfelden; Thomas Strübin, Bubendorf; Walter Teschner, Riehen; Hans Horisberger, Muttenz, all of Switzerland

[73] Assignee: Ciba-Geigy Corporation, Ardsley, N.Y.

[21] Appl. No.: 739,964

[22] Filed: Aug. 5, 1991

[30] Foreign Application Priority Data

Aug. 8, 1990 [CH] Switzerland .................. 2583/90

[51] Int. Cl.$^5$ ............................................. B01D 61/00
[52] U.S. Cl. ................................. 210/650; 210/615; 210/638; 210/661; 210/195.2; 210/257.2
[58] Field of Search .............. 210/638, 650, 651, 652, 210/908, 622, 195.2, 295, 195.3, 605, 69, 615, 257.2, 661

[56] References Cited

U.S. PATENT DOCUMENTS

| | | | |
|---|---|---|---|
| 4,313,830 | 2/1982 | Tulin et al. | 210/651 |
| 4,610,792 | 9/1986 | Van Gils et al. | 210/650 |
| 4,711,723 | 12/1987 | Bray | 210/652 |
| 4,725,357 | 2/1988 | Downing et al. | 210/611 |
| 4,787,978 | 11/1988 | Nicol | 210/622 |
| 5,039,416 | 8/1991 | Loew et al. | 210/638 |
| 5,087,370 | 2/1992 | Scholtheis et al. | 210/638 |

FOREIGN PATENT DOCUMENTS

| | | | |
|---|---|---|---|
| 0352219 | 1/1990 | European Pat. Off. | |
| 9015028 | 12/1990 | European Pat. Off. | 210/650 |
| 0102056 | 8/1979 | Japan | 210/650 |

OTHER PUBLICATIONS

Schneitzer, P. A., Handbook of Separation Technique for Chemical Engineers pp. 2-5.
Hammer, M. J., Water and Wastewater Technology, 2nd Edition, pp. 404-406.
CA104:192831g (1985).
CA102: 225670t (1985).
CA102: 137518u (1985).
CA102: 67144t (1985).
JP-A-63256 197 (Derwent).
JP-A-62 117693 (Derwent).
JP-A-63 054998 (Derwent).

*Primary Examiner*—Robert A. Dawson
*Assistant Examiner*—Ana M. Fortuna
*Attorney, Agent, or Firm*—Kevin T. Mansfield; Edward McC. Roberts

[57] ABSTRACT

There is disclosed a process for purifying ground- and wastewaters, which comprises subjecting said waters to a membrane separation process between a biological treatment step and adsorption on activated carbon.

7 Claims, No Drawings

GROUND- AND WASTEWATER PURIFICATION

The present invention relates to a novel process for the purification of ground- and wastewaters, and to apparatus for carrying out said process.

It is known to use activated carbon to remove traces of substances which contaminate water, especially organic contaminants. Adsorption on activated carbon, however, is uneconomical for separating large amounts of contaminants, for which reason waters containing large concentrations of biologically degradable organics are subjected first to a biological treatment step. The recalcitrants which remain after the biological treatment step are then removed by adsorption on activated carbon to a concentration in the trace range.

The purpose of the sequence of the biological treatment step and carbon adsorption is essentially to purify ground- and wastewaters of very wide provenance. The expression "ground- and wastewaters" thus comprises typically groundwater, surface water, leachates, domestic wastewater, strong sewage, process water, industrial effluent and mixtures of such waters.

Owing to the biological degradation of the contaminants, substantial concentrations of solids or turbid matter accumulate at the outlet of the bioreactor. This matter is mainly biomass. Normally these suspended particles are separated by flocculation and/or sand filtration. Besides the advantage of the comparatively inexpensive operation of such a sand filter, the disadvantages of filters of this kind are:

the particles to be separated must be capable of flocculation, and the concentration of the particles may not be too high.

The above conditions are met when treating ordinary domestic effluents, and sufficient biomass can be retained by a sedimentation or sand filtration to be be able to carry out the subsequent carbon adsorption.

It is, however, no longer practicable to carry out a sand filtration when the degree of contamination of the water fluctuates considerably, or when the composition of the contaminants in the water varies widely, or also when there is an increased and fluctuating salt concentration in the water (15–100 g/l). Then a flocculation of the solids after the biological treatment step, even using flocculants, is difficult or sometimes not even possible.

The present invention has for its object to provide a process by means of which the drawbacks of sand filtration can be overcome, which is suitable for the indicated wide range of contaminated water, which is applicable on an industrial scale, and which enhances the purification capacity of the carbon adsorption.

Surprisingly, this object can be achieved and, in addition, the degradation capacity of the biological treatment in specific cases even enhanced, by a process for purifying ground- and wastewaters, which comprises subjecting said waters to a membrane separation process between a biological treatment step and adsorption on activated carbon.

In principle all biological purification and degradation processes can be used for the biological treatment step. The processes can be carried out aerobically or anaerobically. Preferably they are carried out with a carrier material having a large surface area to which the biomass is bonded, typically a synthetic resin material, in a fluidised bed or fixed-bed reactor.

Throughout this specification, the expression "membrane separation process" will be understood as meaning a separation operation, such as reverse osmosis, ultrafiltration and/or microfiltration, which comprises the use of a membrane (flat or tubular membrane) having a pore size from 0.001 $\mu$m to 10 $\mu$m, preferably from 0.02 $\mu$m to 10 $\mu$m and, most preferably from 0.2 $\mu$m to 0.5 $\mu$m. If the separation process takes the form of a microfiltration, then two different procedures are possible: on the one hand a static filtration and, on the other, a dynamic filtration. The latter procedure is preferred. Static filtrations are known as "dead end" filtrations and are particularly suitable for removing minor amounts of solids. Dynamic filtration, however, is able to remove continuously larger amounts of solids which are drawn off in the concentrate. Dynamic filtration is carried out as a tangential cross-flow filtration at overflow rates of 0.5–8 m/s and under system pressures of 2–10 bar.

The separation of the solids can be effected for as long as the concentrate is still flowable.

The concentrate can then be returned to the raw water stream (recycling). To maintain sufficient filtration rates, it is usually necessary to carry out periodic backwashings.

It has now been found that the described membrane separation process can not only replace the sand filtrations conventionally used hitherto, but in addition affords further substantial advantages. Thus micro-organisms are completely retained, especially in the most preferred pore size range, and do not pass into the subsequent carbon adsorption step. The life of the activated carbon is thereby substantially prolonged, as the undesirable growth of biomass on the carbon does not occur. Such growth can result in odour nuisance and toxicity problems, and can clog the carbon filter during lengthy contact times. The retention of the micro-organisms is ensured even at concentrations of several g/l. A further advantage is that micro-organisms, after separation at the membrane, can be recycled to the biological treatment step, as the concentrate of the membrane separation process can be mixed with the raw water influent. It is of particular interest in this connection that poorly bonded or also specialised micro-organisms are not loss to the biological treatment step but can be recycled, resulting in an enhanced degradation capacity of the biological treatment step.

There is also the possibility of recycling the purified wastewaters once or repeatedly to the bioreactor in order to achieve a complete cycle of the used water. If desired, some of the used water can also be replaced by fresh water. This recycling is of particular interest in the treatment of industrial process waters.

The apparatus for carrying out the above process comprises a combination of a biological treatment stage (bioreactor), a unit for the membrane separation process, and an activated carbon filter unit. The individual units of said apparatus may also be in multiple assembly, for example in parallel or in series. The individual units are each in themselves known. It is only the inventive combination thereof as described herein which leads to the advantages referred to above.

The invention is illustrated by the following Example, but without implying any restriction to what is described therein.

EXAMPLE

The industrial wastewater to be treated has a TOC (total organic carbon) content of c. 2000 mg/l and a salt concentration of 20,000–40,000 mg/l. In addition, it contains several mg/l of bioactive non-degradable substances.

Undissolved matter is removed beforehand.

The biological treatment is carried out in a column (diameter 0.5 m, height 4 m) which contains 80 vol. % of synthetic resin packing (surface area c. 200 m$^2$/m$^3$). The micro-organisms for inoculation originate from the activated sludge of similar reactors. To achieve better degradation, air is blown into the reactor from below. The degradation rate is more than 95%. Some of the biomass resulting from the degradation (mainly bacteria) remains on the surface of the packing, and some is continuously flushed out of the reactor as fine sludge. The total concentration of solids at the outlet of the reactor is 500–2000 mg/l (determined by Swiss standard methods of water analysis).

The discharge from the biological treatment is fed at c. 3 bar overpressure through a cross-flow microfiltration unit which is fitted with an inorganic membrane (nominal pore width 0.2 μm). About 90% of the water passes through the membrane, and the remainder is retained as concentrate and returned to the raw water cycle.

To maintain the filtration rate of ca. 60 l/m$^2$h, a brief counter-pressure is applied at intervals of c. 10–30 minutes, whereby the direction of flow through the membrane is reversed for a short time without interrupting the entire process. The membrane can be cleaned with Javelle water at an interval of several weeks.

The water which has passed through the membrane contains 0 mg/l of undissolved matter and is sterile, thereby ruling out that in the next step the carbon becomes inoculated with micro-organisms.

The final purification step is carbon adsorption in a fixed-bed adsorber. Contact time: c. 1 h.

The TOC content of the purified wastewater is 20–100 mg/l. No more bioactive, non-degradable substances can be detected.

What is claimed is:

1. A process for purifying ground- and wastewaters, which comprises subjecting said waters to a membrane separation process after a biological treatment step and before an adsorption step on activated carbon, wherein microfiltration is carried out with a membrane having a pore size of 0.02 μm to 10 μm.

2. A process for purifying ground- and wastewaters according to claim 1, wherein the microfiltration is carried out with a membrane having a pore size of 0.2 μm to 0.5 μm.

3. A process for purifying ground- and wastewaters according to claim 2, wherein the microfiltration is carried out as a dynamic tangential cross-flow filtration.

4. A process for purifying ground and wastewaters according to claim 3, wherein the concentrate is recycled.

5. A process for purifying ground- and wastewaters according to claim 1, wherein the waters are subjected to a dynamic tangential cross-flow microfiltration with a membrane having a pore size of 0.2 μm to 0.5 μm after a biological treatment step, which is carried out with the aid of a carrier material to which the biomass is bonded in a fixed-bed reactor, and before the adsorption on activated carbon, and the concentrate is recycled.

6. A process for purifying ground- and wastewaters according to claim 1, wherein the purified wastewater is wholly or partially subjected to recycling.

7. An apparatus for purifying ground- and wastewaters, which comprises the combination of a fluidized or fixed-bed bioreactor to impart a biological treatment to said water, a microfiltration unit to receive and filter the biologically treated water and an activated carbon adsorption unit to receive and filter the effluent from the microfiltration unit, the individual units of which apparatus may be in multiple assembly, either in parallel or in series.

* * * * *